SYNCHRONOUS DEMODULATOR WITH STABILIZED AMPLIFIERS AND BLANKING

Filed Sept. 15, 1965

INVENTOR.
WILLIAM D. MURPHY
BY
Robert E. Strausser
ATTORNEY

INVENTOR.
WILLIAM D. MURPHY
BY Robert E. Strauss
ATTORNEY

United States Patent Office
3,376,380
Patented Apr. 2, 1968

3,376,380

SYNCHRONOUS DEMODULATOR WITH STABILIZED AMPLIFIERS AND BLANKING

William D. Murphy, Emporium, Pa., assignor to Sylvania Electric Products Inc., a corporation of Delaware Filed Sept. 15, 1965, Ser. No. 487,458
3 Claims. (Cl. 178—5.4)

ABSTRACT OF THE DISCLOSURE

A color television receiver synchronous demodulation system includes a pair of demodulator tubes, a matrix network coupled thereto, and an individual amplifier coupled to a color picture tube and via a bias developing network to each of the demodulator tubes and the matrix network. Chrominance, reference oscillation and pulse signals are applied to each of the demodulator tubes to blank the demodulator tubes during scan retrace and provide a pair of color difference signals and amplified pulse signals. The color difference signals are treated in the matrix network to provide a third color difference signal and all three color difference signals are amplified and applied to the color picture tube. The amplified pulse signals are applied via a bias developing network to each of the amplifiers to provide stabilization against drift therein, amplified, and applied to the color picture tube to provide blanking of the color picture tube during scan retrace.

Figure 1:
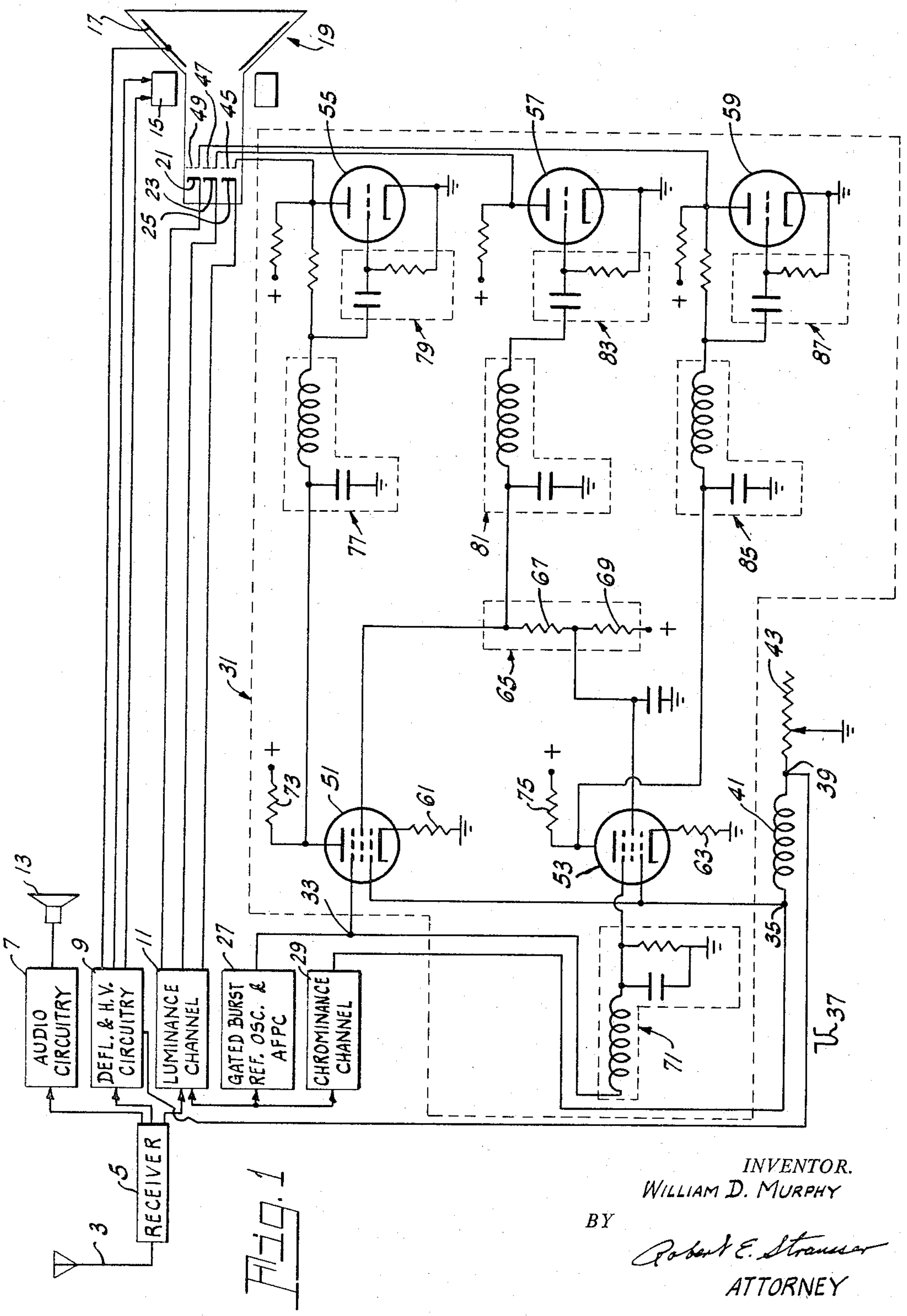

This invention relates to an improved synchronous demodulator for a color television receiver and more particularly to an improved system for providing a trio of color difference signals applicable to a color picture tube from a composite chrominance signal as well as associated circuitry for stabilizing a color difference signal amplifying system and providing a picture tube blanking signal during a scan retrace period.

The prior art suggests a number of synchronous demodulation systems for obtaining a trio of color difference signals applicable to a color picture tube from a composite chrominance signal including $R-Y$ and $B-Y$ information. One well-known system suggests a pair of demodulator tubes each having a pair of control grids and a common cathode circuit. A chrominance signal is applied to one control grid of each demodulator tube and a reference oscillation signal at a phase other than quadrature is applied to the other control grid of the demodulator tubes. Because of the common cathode circuit, the signals available between the anode and cathode of the demodulator tubes would not be at the desired $R-Y$ and $B-Y$ phase, but rather two voltages $E_1$ and $E_2$. However, by adjusting the phase of the reference oscillation signals applied to the control grids of the demodulator tubes to correspond to the phase angles of the voltages $E_1$ and $E_2$, there is provided across the load resistor of each demodulator tube a color difference signal representative of $R-Y$ and $B-Y$ information as well as a color difference signal representative of $G-Y$ information in the common cathode circuit. These color difference signals are then applied to the control grid electrodes of a color picture tube.

Other demodulators include a system wherein an $R-Y$ and $B-Y$ color difference signal in the individual output circuitry of a pair of demodulator tubes is coupled to separate control grids of a color picture tube. A matrix circuit coupled to the output circuits of the demodulator tubes serves to provide a $G-Y$ color difference signal which is amplified and applied to a third control grid of the color picture tube. Another system utilizes a pair of demodulator tubes in a single envelope and the two tubes include a common cathode, control grid, and screen grid. A common resistor is coupled to the screen grids whereacross is developed a $G-Y$ color difference signal which is applied to the third grid of a color picture tube.

While all of the above-mentioned demodulator systems have contributed to the advancement of color television receivers, it has been found that each leaves much to be desired in one or more respects. For example, it is known that the utilization of a common component to develop a $G-Y$ color difference signal results in the development of an undesirable crosstalk signal. Thus, this crosstalk signal must be compensated for in some manner and a common approach is to alter the phase of reference oscillation signal applied to the demodulator tubes to an angle other than the preferred quadrature relationship. Obviously, such a phase shifting requirement is highly undesirable.

Further, demodulator systems employing a matrix in the load circuits of the demodulator tubes have an inherent disadvantage with respect to efficiency and signal availability. For instance, a demodulator tube driven to cut off by a chroma signal should have a resultant plate voltage substantially equal to the value of the plate voltage supply. However, the matrix network tends to act as a voltage divider which prevents the plate voltage from attaining the value of the plate supply voltage. Thus, the efficiency of the circuitry and signal available therefrom is undesirably limited.

Also, a system having a dual-section tube with a common screen grid to which is coupled a resistor for developing a $G-Y$ color difference signal is troubled by the fact that a true color rendition is unattainable due to the unavailability of a true $G-Y$ color difference signal. Since the $R-Y$ and $B-Y$ color difference signals are not available at the common resistor in proportions suitable to provide a true $G-Y$ color difference signal and there is no available means for altering this proportion without deleteriously affecting the original color difference signals, the system leaves much to be desired.

Additionally, the prevalent use of color difference amplifiers which are DC coupled to the grids of the picture tube necessitates a stabilizing system to reduce the effects of long-term instability of the DC amplifiers wherein a shift in plate current would cause a change in the grid bias and white balance of the picture tube during the horizontal scanning period.

A method frequently used in present-day color television receivers to provide stabilization of the color difference amplifiers and blanking of the picture tube during horioznta1 retrace, is the utilization of a triode pulse amplifier. The retrace, is the utilization of a triode pulse amplifier. The amplifier is usually activated by a pulse signal from the high voltage system and provides a negative-going pulse signal which is capacitively coupled to the cathodes of the color difference amplifiers. The pulse is of sufficient amplitude to cause the color difference amplifiers to draw grid current and develop a negative DC bias which will vary in accordance with changing tube characteristics. Also, the pulse signal is applied to the cathodes of the picture tube by way of a resistor switch arrangement for altering the bias on the picture tube and serves to blank the picture tube during the period of horizontal retrace.

While such a system is acceptable the system is not without expense in components, assembly labor, and chassis space. Moreover, the application of the pulse signal to the relatively low impedance cathode circuit of the color difference amplifiers necessitates the use of a relatively high power pulse signal.

Therefore, it is an object of this invention to provide an enhanced color demodulation system for a color television receiver.

Another object of the invention is to improve the cost factor of a synchronous demodulation system in a color television receiver.

A further object of the invention is to reduce the circuit complexity of a synchronous demodulation system in a color television receiver.

A still further object of the invention is to simplify the stabilization circuitry of a color demodulation system in a color television receiver.

These and other objects are achieved in one aspect of the invention in a color television receiver having a reference oscillation signal source, a chrominance signal source, a pulse signal source and a color picture tube with a trio of control grids by a synchronous demodulation system having a pair of demodulator tubes each having a cathode, first, second, and third grids, and an anode and three color difference amplifiers each having a cathode, control grid, and anode. A reference oscillation signal in quadrature relationship is applied to the third grids of the demodulator tubes and a composite chrominance signal and a pulse signal are applied to the first grid of both demodulator tubes. An inverted $R-Y$ color difference signal and a pulse signal appearing in the output circuit of the first demodulation tube is applied to the control grid of the first color difference amplifier. An inverted $B-Y$ color difference signal and a pulse signal appearing in the output circuit of the second demodulator tube is applied to the control grid of the third color difference amplifier.

The second grids of the demodulator tubes are coupled through a matrix load network whereacross appears an inverted $G-Y$ color difference signal and a pulse signal. These signals are coupled to the control grid of the second color difference amplifier. An individual load circuit in each of the three color difference amplifier circuits is coupled to the first, second and third control grids respectively of the color picture tube.

Figure 2:
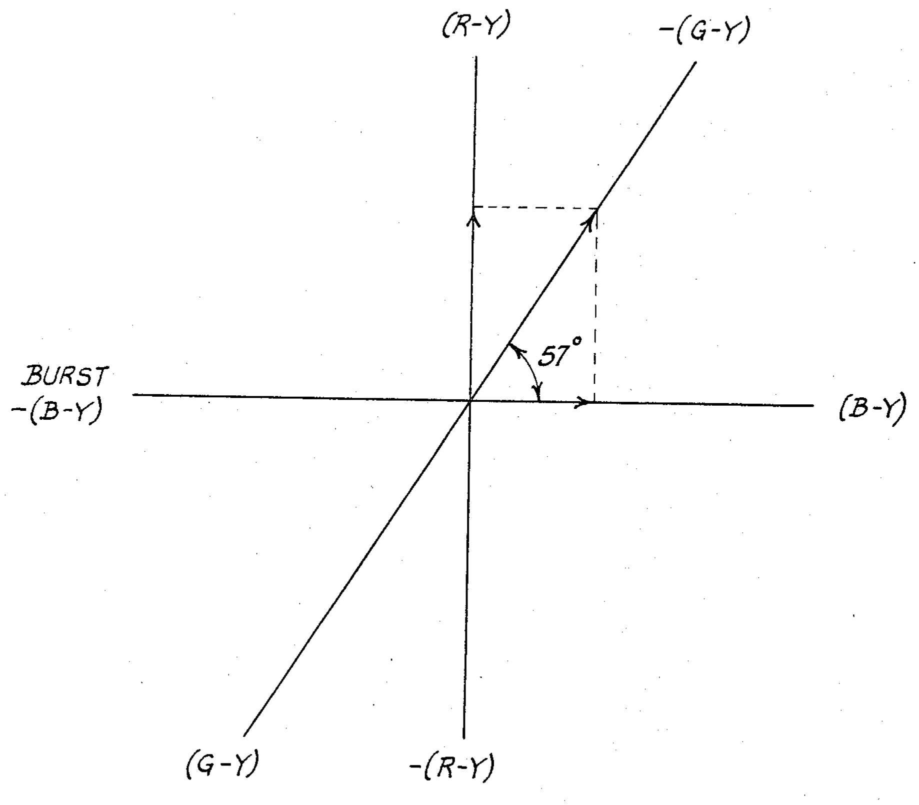

For a better understanding of the present invention, together with other and further objects, advantages and capabilities thereof, reference is made to the following disclosure and appended claims in connection with the accompanying drawings in which:

FIG. 1 is a block diagram of a color television receiver including one embodiment of a synchronous demodulation, amplifier stabilization, and picture tube blanking system; and FIG. 2 is a vector diagram illustrating the phase relationship of a trio of color difference signals with respect to the usual burst and color demodulation axes.

Referring to FIG. 1 of the drawings, a transmitted color television signal is intercepted by an antenna 3 and coupled to a receiver 5. The receiver 5 includes the usual RF amplifiers, converters and IF amplifiers and provides a demodulated signal which is coupled to the audio circuitry 7, the deflection and high voltage circuitry 9, and a luminance channel 11.

In the audio circuitry 7, the sound information is demodulated and amplified and therefrom applied to a loudspeaker 13. The deflection and HV circuitry 9 separates synchronizing signals from the composite color television signals, and develops horizontal and vertical deflection signals as well as HV potentials. The deflection signals are applied to a deflection yoke 15 and the HV potentials are applied to a HV anode 17 to provide the usual scanning and operational potentials for the picture tube 19.

The color television signal is also applied in the luminance channel 11 wherein the signal is amplified and delayed in time and an output signal representative of brightness variations of an image is delivered to the first, second, and third cathodes 21, 23, and 25 of the picture tube 19 at a ratio consistent with the rendition of a televised color image as will be explained hereinafter. The luminance channel also provides an output signal which is applied to a gated burst amplifier, reference oscillation signal generator, and automatic frequency and phase control circuit 27 as well as to a chrominance channel 29.

In the gated burst amplifier, reference oscillation signal generator, and automatic frequency and phase control circuit 27, a reference oscillator signal is developed having the frequency of the color burst in the television signal and at an accurately maintained phase dependent upon the phase control circuitry. This frequency and phase controlled reference oscillation signal is applied to a synchronous demodulator 31 by way of an input terminal 33. The chrominance channel 29 separates a chrominance signal from the composite color signal and applies this signal in amplified form to the synchronous demodulator 31 by way of an input terminal 35.

Additionally, a pulse signal 37 taken from the horizontal oscillator in the deflection and HV circuitry 9 in this particular embodiment is applied to the demodulator 31 by way of an input terminal 39 and an inductor 41. The input terminal 39 is also coupled to circuit ground by way of a variable resistor 43 as will be explained hereinafter.

The synchronous demodulator 31 receives the reference oscillation signals, chrominance signals including $R-Y$ and $B-Y$ information, and pulse signals and develops therein a trio of demodulated color difference signals $R-Y$, $G-Y$, and $B-Y$ which are individually applied to the first, second, and third control grids 45, 47, and 49 respectively of the color picture tube 19. Additionally, the pulse signal received by the demodulator 31 is amplified and applied at a desired phase and amplitude to the first, second, and third control grids 45, 47, and 49 of the picture tube 19.

The luminance signal and the color difference signals, $R-Y$, $G-Y$, and $B-Y$, are added together in the color picture tube 19 in a manner such that the electron beams within the picture tube 19 are modulated to provide a color image representative of the image information transmitted in the composite color signal. Also, the pulse signal serves to black out or blank the picture tube 19 during the period of horizontal retrace of the electron beams.

The synchronous demodulator 31 includes a first and second demodulator tube 51 and 53 each having a cathode, first, second, and third grid, and an anode and a trio of color difference amplifiers 55, 57, and 59 each having a cathode, control grid, and anode. The cathodes of each of the demodulator tubes 51 and 53 are coupled to circuit ground by means of bias resistors 61 and 63 respectively. The first grids of both demodulator tubes 51 and 53 are connected to the chrominance signal input terminal 35 and the second grids of both tubes 51 and 53 are coupled to a voltage source (+) by way of a load matrix 65 including a pair of series connected resistors 67 and 69.

The third grid of the first demodulator tube 51 is directly connected to the reference oscillation signal input terminal 33 while the third grid of the second demodulator tube 53 is coupled thereto through a phase shifting network 71. The anodes of each of the demodulator tubes 51 and 53 are coupled to a voltage source (+) by way of load resistors 73 and 75 respectively. An $R-Y$ color difference signal appearing in the anode output circuit of the first demodulator tube 51 is coupled through a low pass filter 77 and bias network 79 to the control grid of a first color difference amplifier 55. A $G-Y$ color difference signal at the load matrix 65 is coupled by way of a low pass filter 81 and a bias network 83 to the control grid of the second color difference amplifier 57. A $B-Y$ color difference signal appearing in the anode output circuit of the second demodulator tube 53 is coupled through a low pass filter 85 and a bias network 87 to the control grid of the third color difference amplifier 59. Amplified color difference signals, $R-Y$, $G-Y$, and $B-Y$ respectively, in the load circuits of each of the color difference amplifiers 55, 57, and 59 are directly coupled to individual control grids 45, 47, and 49 of the picture tube 19.

As to the operations of synchronous demodulation, stabilization of the color difference amplifiers 55, 57, and 59, and blanking of the picture tube 19, the synchronous demodulator 31 employs a first and second multi-grid demodulator tube 51 and 53 and each provides a pair of output signals having a 180° phase relationship. As is well known in the art, a signal applied to the third grid of a multi-grid tube may be utilized to control the proportion of total cathode current which flows to the second grid and to the anode thereof. For instance, a relatively high potential signal applied to the third grid of a multi-grid tube will cause a major portion of the total cathode current to flow to the anode and a minor portion to the second grid. Obviously, a relatively low potential signal applied to the third grid provides an exact opposite effect thereby providing output signals at the anode and the second grid having an inverse or 180° phase relationship. Also, a signal applied to the first grid of the multi-grid tube serves to determine the instantaneous cathode current flow therein.

Referring to FIG. 1, a chrominance signal which includes $R-Y$ and $B-Y$ color information available at the input terminal 35 is directly applied to the first grid of the demodulator tubes 51 and 53. A reference oscillation signal available at an input terminal 33 and having a phase angle suitable for combination with the above-mentioned chrominance signal to provide a demodulated output signal coincident with an $R-Y$ color difference axis is applied to the third grid of the first demodulator tube 51. This same reference oscillation signal is conveyed through a phase shift network 71 and applied in quadrature phase relationship to the third grid of the second demodulator tube 53. Since the $R-Y$ and $B-Y$ color difference axes have a quadrature phase relationship, the demodulated output signal of the second demodulator tube 53 is coincident with a $B-Y$ color difference axis. Assuming a positive-going chrominance envelope applied to the first grid of the demodulator tubes 51 and 53, it follows that there is provided in the anode output circuit of the first demodulator tube 51 a $-(R-Y)$ color difference signal and in the anode output circuit of the second demodulator tube 53 a $-(B-Y)$ color difference signal.

As previously mentioned, a second output signal having a 180° phase relationship will be provided at the second grid of each of the demodulator tubes 51 and 53. Thus, the series connected load resistors 67 and 69 intermediate the second grid of the demodulator tube 51 and a voltage source (+) will have developed thereacross an $R-Y$ color difference signal and the resistor 69 intermediate the second grid of the demodulator tube 53 and the voltage source (+) will have developed thereacross a $B-Y$ color difference signal. Moreover, these $R-Y$ and $B-Y$ color difference signals will be combined in the matrix load 65 to provide an output signal representative of a $-(G-Y)$ signal.

Referring to the vector diagram of FIG. 2 illustrating the well-known phase relationships between the color burst, R—Y color difference axis, B—Y color difference axis, and $G-Y$ color difference axis, it can be readily understood that the application of a chrominance signal including a positive-going envelope of $R-Y$ information to the first grid of the first demodulator tube 51 in combination with a reference oscillation signal at properly selected phase angle applied to the third grid thereof will provide a negative-going or $-(R-Y)$ color difference signal in the anode output circuit thereof. In a similar manner, the application to the second demodulator tube 53 of a positive-going $B-Y$ information in quadrature relationship to the $R-Y$ signal and a reference oscillation signal in quadrature relationship to the reference oscillation signal applied to the first demodulator tube 51 will combine to provide a negative-going or $-(B-Y)$ signal in the anode output circuit of the second demodulator tube 53.

As previously explained, an $R-Y$ color difference signal will be developed across the series resistor 67 and 69 and a $B-Y$ color difference signals across the resistor 69 which will be combined to provide a $-(G-Y)$ color difference signal in the output circuit of the load matrix 65. It can be readily understood that incorrect proportions of $R-Y$ and $B-Y$ signals in the load matrix 65 will result in a $-(G-Y)$ color difference signal which is not at a phase angle coincident with the $G-Y$ axis and therefore would not provide a true rendition of color. However, by proper selection of the ohmic value of the resistors 67 and 69, there is provided the desired proportion of $R-Y$ and $B-Y$ color difference signals such that the resultant color difference signal is coincident with the $G-Y$ axis and true color rendition is achieved. Moreover, the usual crosstalk signal normally occurring when demodulator tubes are coupled through a common impedance is of negligible value and may be ignored for all practical purposes in the embodiment of FIG. 1 because of the relatively low ohmic value of the resistors 67 and 69. As a specific example, resistor 67 had a value of about 470 ohms and resistor 69 a value of about 620 ohms in the embodiment of FIG. 1. Thus, the inconsequential value of the crosstalk signal permits the utilization of a quadrature phase relationship of the reference oscillation signals applied to the third grid of the demodulator tubes 51 and 53.

The $-(R-Y)$ color difference signal at a phase coincident with the $R-Y$ axis appearing in the anode output circuit of the first demodulator tube 51 is coupled through the low pass filter 77 and bias network 79 to the grid of the first color difference amplifier 55 wherein the signal is phase inverted and amplified to provide an $R-Y$ color difference signal which is applied to the control grid 45 of the picture tube 19. The $-(G-Y)$ color difference signal at a phase coincident with the $G-Y$ axis appearing at the matrix load circuit 65 is coupled through a low pass filter 81 and a bias network 83 to the color difference amplifier 57 wherein the signal is phase inverted and amplified to provide a $G-Y$ color difference signal which is applied to the control grid 47 of the picture tube 19. The $-(B-Y)$ color difference signal at a phase coincident with the $B-Y$ axis appearing in the anode output circuit of the second demodulator tube 53 is similarly coupled through a low pass filter 85 and bias network 87 to the grid of a third color difference amplifier 59 wherein the signal is phase inverted and amplified to provide a $B-Y$ color difference signal which is coupled to the control grid 47 of the picture tube 19.

Additionally, the negative-going pulse signal 37 applied to the control grids of both of the demodulator tubes 51 and 53 serves to at least partially blank the color difference output signals therefrom. The signal is phase inverted and amplified therein and appears in the anode output circuits of both tubes 51 and 53 as a positive-going pulse. The positive-going pulse from the anode output circuit of the first demodulator tube 51 is applied to the relatively high impedance control grid of the first color difference amplifier 55 causing a flow of grid current which is applied to the bias network 79 to provide stabilization and a reduction in DC drift due to variations in the amplifier tube 55. Further, the pulse signal is inverted and amplified therein to provide a negative-going output pulse signal which is applied to the control grid 45 of the picture tube 19 and serves to blank the picture tube 19 during the period of horizontal electron beam scan retrace.

Similarly, the pulse signal from the anode output circuit of the second demodulator tube 53 serves to stabilize the third color difference amplifier 59 by way of the bias network 83 and blank the picture tube 19 by way of the control grid 49. Also, the negative-going pulse signal applied to the control grid of the demodulator tubes 51 and 53 serves to reduce the flow of cathode current therein providing a positive-going pulse at the matrix 65 which is applied to the control grid of the second amplifier 57 through the bias network 81 serving to provide stabilization of the amplifier 57 and blanking of the picture tube 19 by way of the control grid 47. Moreover, a simple variable resistor 43 is employed to control the amplitude of the pulse signal and alter the bias on the picture tube 19.

Thus, there has been provided a unique and enhanced synchronous demodulation amplifier stabilizing, and picture tube blanking system. Utilization has been made of pulse signals already available in a color television receiver to eliminate a blanking amplifier stage thereby reducing component and labor costs and improving available space efficiency. The system permits the use of a relatively low power blanking pulse at high impedance as contracted with known circuitry requiring a relatively high power blanking pulse at low impedance. Further, the system provides a true rendition of colors at a viewing screen and develops a relatively negligible crosstalk signal permitting the highly desirable application of reference oscillation signals having a quadrature phase relationship.

While there has been shown and described what is at present considered the preferred embodiment of the invention, it will be obvious to those skilled in the art that various changes and modifications may be made therein without departing from the invention as defined by the appended claims.

What is claimed is:

1. In a color television receiver having a color picture tube, a source of chrominance signals, a source of reference oscillation signals, and a source of blanking pulse signals, demodulation and picture tube blanking circuitry comprising in combination a first and second demodulator tube; circuit means for applying signals from said chrominance, reference oscillation, and blanking pulse sources to said first and second demodulator tubes; a matrix load circuit coupling said first and second demodulator tubes; a first, second, and third color difference amplifier; circuit means including individual bias networks each having a bias developing capacitor therein coupling a first color difference and blanking pulse signal from said first demodulator tube, a second color difference and blanking pulse signal developed across said matrix, and a third color difference and blanking pulse signal from said second demodulator tube to said first, second, and third color difference amplifiers respectively; and means coupling said first, second, and third color difference signals and blanking pulse signals from said first, second, and third color difference amplifiers to individual electrodes of said color picture tube.

2. In a color television receiver having a picture tube, a source of chrominance signals including $R-Y$ and $B-Y$ information, a source of reference oscillation signals, and a source of pulse signals, a demodulation and blanking pulse circuit comprising in combination a first and second demodulator tube each having a cathode, first, second, and third grid, and anode; a first, second, and third color difference amplifier each having a cathode, grid, and anode; means for applying said chrominance signals and said pulse signals to the first grid of both of said demodulator tubes; means including a phase shifting network for applying said reference oscillation signals to the third grid of said first demodulator tube and to the third grid of said second demodulator tube; a matrix load circuit including a first and second impedance coupling the second grids of said first and second demodulator tubes; means including a low pass filter and a bias developing network including a bias developing capacitor therein coupling color difference signals and pulse signals from the anode output circuit of said first demodulator tube, the matrix load circuit, and the anode output circuit of said second demodulator tube to the grids of said first, second, and third color difference amplifiers respectively; and a color difference and pulse signal output circuit coupling the anode of each of said first, second, and third color difference amplifiers to an individual electrode of said color picture tube.

3. In a color television receiver having a color picture tube with a first, second, and third control grid, a source of chrominance signals including $R-Y$ and $B-Y$ information, a source of reference oscillation signals, and a source of pulse signals, a demodulation and blanking pulse signal circuit comprising in combination a first and second demodulator tube each having a cathode, first, second, and third grid, and anode; a first, second, and third color difference amplifier each having a cathode, grid, and anode; means for coupling said chrominance signals and pulse signals to the first grid of both demodulator tubes; means including a phase shifting network for coupling said reference oscillation signals in substantially quadrature phase relationship to the third grids of said first and second demodulator tubes; a matrix load circuit including a first and second resistor coupling the second grids of said demodulator tubes and a voltage source; means including a series connected low pass filter and bias developing network for developing a bias potential in response to said pulse signal coupling $R-Y$ color difference and pulse signals from an anode output circuit of said first demodulator tube to the grid of said first color difference amplifier; means including a series connected low pass filter and bias developing network for developing a bias potential in response to said pulse signal coupling $G-Y$ color difference and pulse signals from said matrix load circuit to the grid of said second color difference amplifier; means including a bias developing network for developing a bias potential in response to said pulse signal coupling $B-Y$ color difference and pulse signals from an anode output circuit of said second demodulator tube to the grid of said third color difference amplifier; and means coupling $R-Y$, $G-Y$, and $B-Y$ color difference signals and pulse signals from an anode output circuit of each of first, second, and third color difference amplifiers to a first, second, and a third control grid respectively of a color picture tube.

References Cited

UNITED STATES PATENTS

| | | | |
|---|---|---|---|
| 2,779,818 | 1/1957 | Adler et al. | 178—5.4 |
| 2,901,534 | 8/1959 | Oakley | 178—5.4 |
| 2,917,575 | 12/1959 | Heuer | 178—5.4 |
| 2,935,556 | 5/1960 | Barco | 178—5.4 |
| 2,938,072 | 5/1960 | Macovski | 178—5.4 |
| 2,990,445 | 6/1961 | Preisig | 178—5.4 |

ROBERT L. GRIFFIN, *Primary Examiner.*

JOHN W. CALDWELL, *Examiner.*

J. A. O'BRIEN, *Assistant Examiner.*

UNITED STATES PATENT OFFICE

CERTIFICATE OF CORRECTION

Patent No. 3,376,380 April 2, 1968

William D. Murphy

It is certified that error appears in the above identified patent and that said Letters Patent are hereby corrected as shown below:

Column 2, line 51, "horizontal" should read -- horizontal --; lines 52 and 53, cancel "The retrace, is the utilization of a triode pulse amplifier.". Column 3, lines 47 and 48, "syster" should read -- system --; line 68, "in" should read -- to --. Column 4, line 6, "oscillator" should read -- oscillation --. Column 8, line 47, "of first" should read -- of said first --.

Signed and sealed this 19th day of August 1969.

(SEAL)
Attest:

Edward M. Fletcher, Jr.
Attesting Officer

WILLIAM E. SCHUYLER, JR.
Commissioner of Patents